(12) United States Patent
Lee

(10) Patent No.: US 6,438,488 B2
(45) Date of Patent: Aug. 20, 2002

(54) NAVIGATION SYSTEM FOR PROCESSING INFORMATION ABOUT ADJACENT POSITION AND METHOD THEREOF

(75) Inventor: Ho-seok Lee, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 17 days.

(21) Appl. No.: 09/774,012

(22) Filed: Jan. 31, 2001

(30) Foreign Application Priority Data

May 26, 2000 (KR) ............................................. 00-28655

(51) Int. Cl.⁷ .............................................. G01C 21/00
(52) U.S. Cl. ...................... 701/208; 701/209; 701/205; 340/988
(58) Field of Search ................................ 701/208, 201, 701/205, 209, 200; 340/988, 989, 990, 995; 73/178 R

(56) References Cited

U.S. PATENT DOCUMENTS

| | | | | |
|---|---|---|---|---|
| 5,710,565 A | * | 1/1998 | Shirai et al. ................. 340/903 |
| 6,111,539 A | * | 8/2000 | Mannings et al. ..... 342/357.09 |
| 6,133,853 A | * | 10/2000 | Obradovich et al. ......... 340/488 |
| 6,157,891 A | * | 12/2000 | Lin ............................. 244/180 |
| 6,163,750 A | * | 12/2000 | Nojima ........................ 340/988 |
| 6,167,346 A | * | 12/2000 | Fukawa ....................... 701/208 |
| 6,236,935 B1 | * | 5/2001 | Helmstadter et al. ........ 701/205 |
| 6,246,932 B1 | * | 6/2001 | Kageyama et al. .......... 340/992 |
| 6,292,743 B1 | * | 9/2001 | Pu et al. ....................... 455/456 |
| 6,336,075 B1 | * | 1/2002 | Park et al. .................... 340/988 |
| 6,349,259 B1 | * | 2/2002 | Sato ............................. 340/988 |
| 6,356,835 B2 | * | 3/2002 | Hayashi et al. .............. 340/988 |

* cited by examiner

Primary Examiner—William A. Cuchlinski, Jr.
Assistant Examiner—Olga Hernandez
(74) Attorney, Agent, or Firm—Sughrue Mion, PLLC

(57) ABSTRACT

A navigation system for downloading adjacent position information of a current user position using a wireless network to display the downloaded information on a screen and method thereof are provided. The method includes the steps of: setting a starting point, a destination, and specific information to be displayed on a screen; calculating a current user position based on position information received from a wireless network and identification (ID) information; displaying a user movement based on information stored in a database, or, alternatively, requesting a server to send specific information about the adjacent position which is set in the setting step; and downloading only the specific information to display the downloaded result on a screen while displaying a user movement on the corresponding screen. According to the navigation system and method thereof, only necessary information about the adjacent position is downloaded, thereby improving the efficiency of the navigation system.

7 Claims, 5 Drawing Sheets

NAVIGATION SYSTEM FOR PROCESSING INFORMATION ABOUT ADJACENT POSITION AND METHOD THEREOF

BACKGROUND OF THE INVENTION

1. Field of the Invention

The present invention relates to a geographical information processing system, and more particularly, to a navigation system for downloading information about a position adjacent to a current user position using a wireless network to display the downloaded information on a screen and method thereof. The present application is based on KPA 00-28655, which is incorporated herein by reference.

2. Description of the Related Art

In general, navigation systems are provided with map information and display a navigation function to users. FIG. 1 shows a navigation screen in a conventional automobile navigation system. Referring to FIG. 1, the navigation screen includes map data, administrative district data, graphical feature and object data for a route from Seoul to Daegu. In this case, the map data may have several levels depending on a reduced scale and detailed information. The administrative district information may have data that varies depending on levels of map data. The graphical feature and object data includes information about gas stations, hospitals, and schools, and control data may be added to each graphical feature and object.

To display the navigation screen as shown in FIG. 1, the conventional navigation system calculates navigation data using one of the following methods. The first method is to store all navigation data of the whole country in a memory since the navigation system cannot predict the direction in which the user travels. The second one is for the navigation system to download all necessary data for a route between a desired destination and a selected starting point, which are designated in advance from a navigation data server of a personal computer. This is used for the case in which the navigation system lacks a memory space for storing all data for the whole country.

However, the first method cannot be applied to a small-sized navigation system in which a memory size is small and performance is low since all navigation data needs to be stored in a memory. Furthermore, to apply the second method, a navigation system must have all downloaded data for a corresponding route, and in particular if the starting point and the desired destination are changed, the second method cannot be used.

Therefore, conventional navigation systems to which the above methods are applied suffer from a drawback in that the efficiency of the overall system is degraded since as more data is stored, more capacity is allocated for searching for necessary information and processing the searched information.

SUMMARY OF THE INVENTION

To solve the above problems, it is an objective of the present invention to provide a navigation system for improving its efficiency by downloading only necessary information about an adjacent position from a server using a tracking system and method thereof.

Accordingly, to achieve the above objective, the present invention provides a method of processing navigation information in a navigation system including a database, the method comprising the steps of: (a) setting a starting point, a destination, and specific information to be displayed on a screen; (b) calculating a current user position based on position information received via a wireless network and identification (ID) information; (c) if information about a position adjacent to the current user position calculated in the step (b) is stored in the database, displaying a user movement based on the stored information, and if not, requesting a server to send specific information about the adjacent position which is set in the step (a); and (d) if the specific information about the position adjacent to the current user position, which is requested in the step (c), is searched for by the server, downloading only the specific information to display the downloaded result on a screen while displaying a user movement on the corresponding screen.

The present invention also provides a navigation system including: a navigation unit which transmits current user position information to a server after calculating the current user position using position information received via a wireless network to request only specific information about a position adjacent to the current user position, and which displays a user movement based on the specific information about the adjacent position after downloading the specific information about the adjacent position from the server; and a server which searches for only the specific information about the adjacent position with respect to the current position according to the current user position and the request for the specific information about the adjacent position received from the navigation unit and transmits the searched result to the navigation unit.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
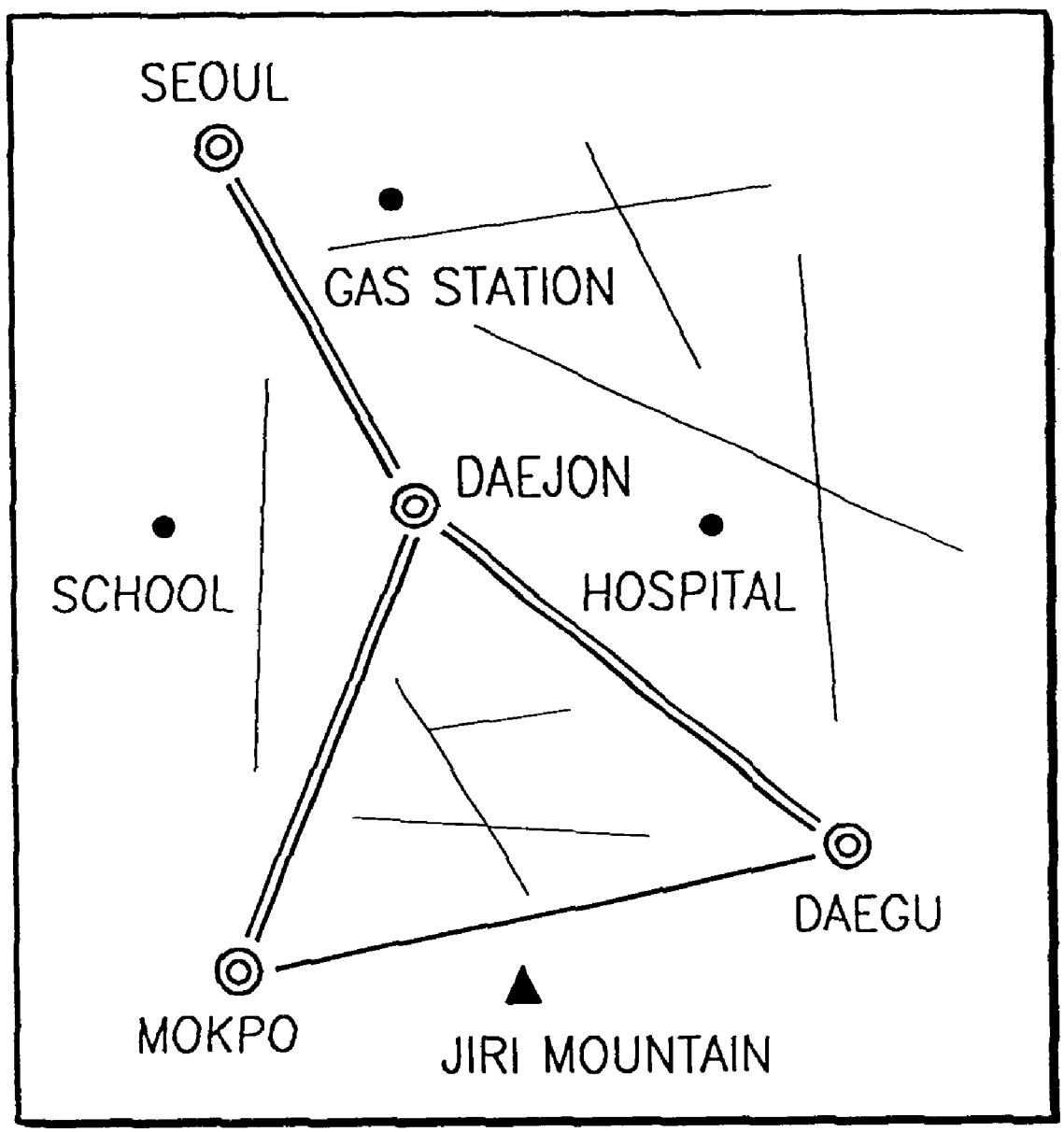
FIG. 1 illustrates a navigation screen of a conventional automobile navigation system.
Figure 2:
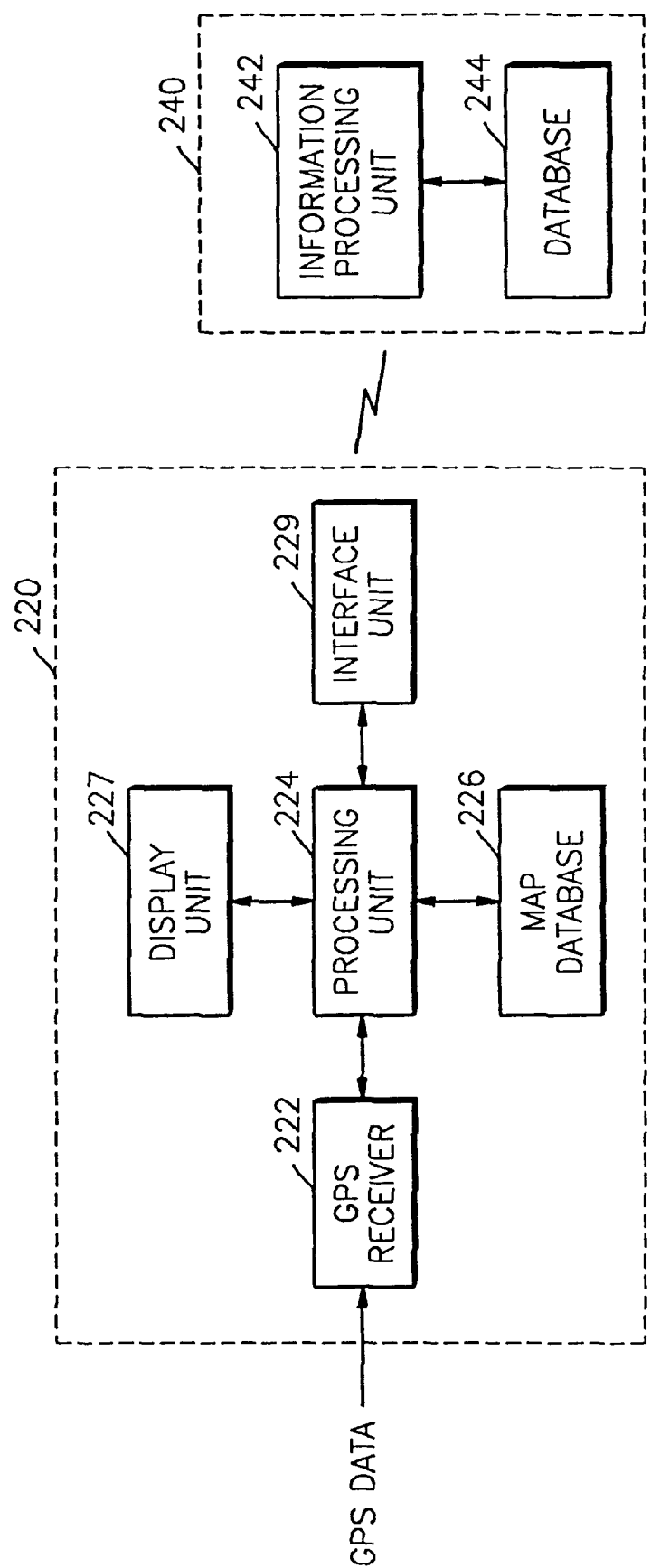
FIG. 2 is a block diagram showing a navigation system according to the present invention.

Referring to FIG. 2, a navigation system is divided into a navigation unit 220 and a server 240. The navigation unit 220 includes a Global Positioning System (GPS) receiver 222, a processing unit 224, a map database 226, a display unit 227, and an interface unit 229. The server 240 includes an information processing unit 242 and a database 244.

In the navigation unit 220, the GPS receiver 222 receives position information transmitted from a GPS satellite to the surface of the earth by radio waves. The map database 226 is a memory for storing navigation information including a road map. The display unit 227 displays a current position available from GPS information, map data stored in the map database 226, or map information received from the server 240. The interface unit 229 interfaces map information received from the server 240 and navigation information sent to the server 240. The processing unit 224 sets a starting point, a destination, and necessary data by the user and then calculates a current user position using GPS information (or position information) received from the GPS receiver 222 and identification (ID) information stored in a memory (not shown). Furthermore, the processing unit 224 displays a user's movement if data for a position adjacent to the current user position is stored in a map database 226, and if not, transmits the current user position data to the server 240 via the interface unit 229 and requests only necessary information about the adjacent position.

In the server 240, upon receipt of an information request signal from the navigation unit 220, the information processing unit 242 extracts only the requested information related to the current user position from the database 244 and transmits the extracted result to the navigation unit 220.

Figure 3:
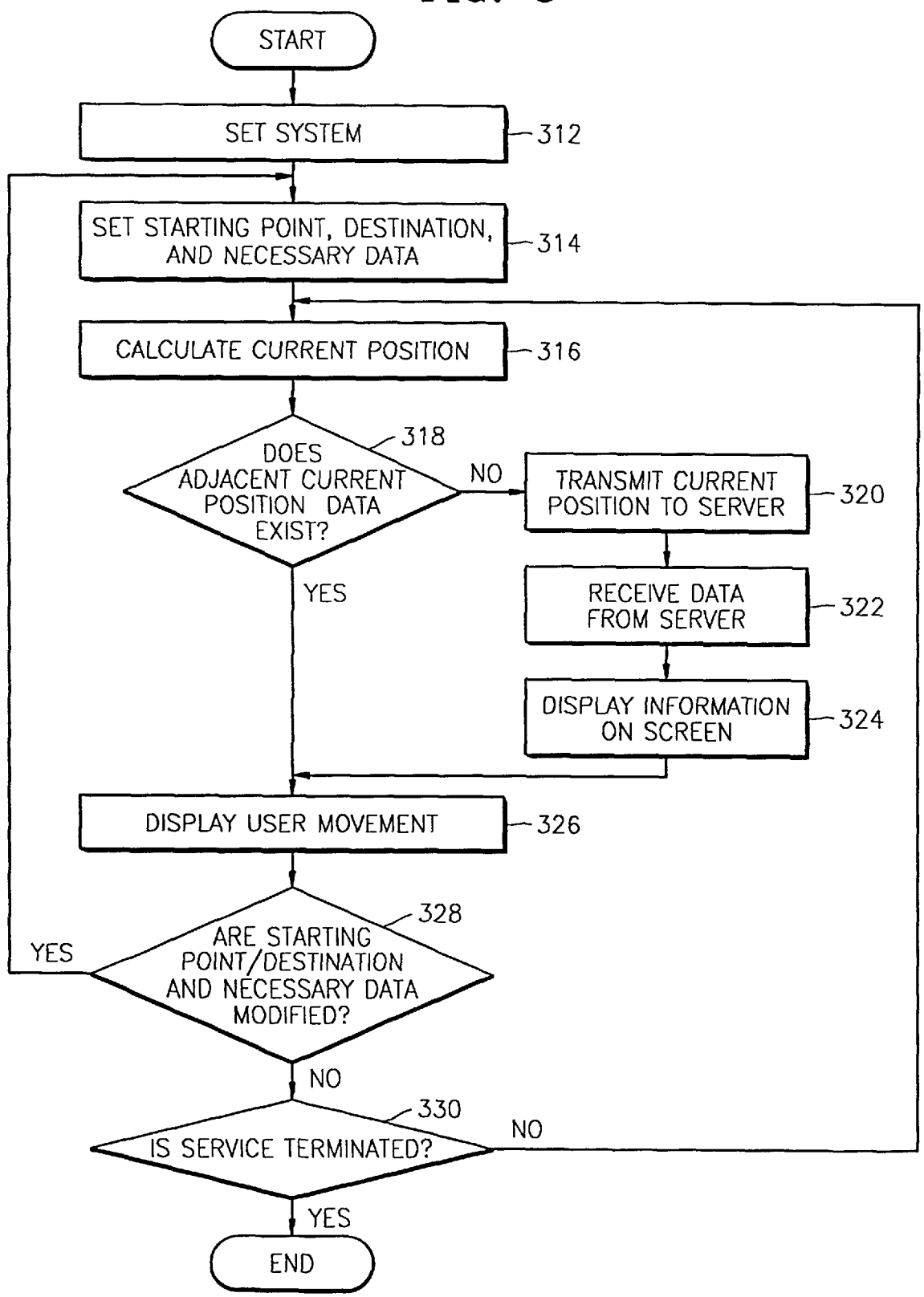
FIG. 3 is a flowchart showing a navigation method according to the invention.

FIG. 3 is a flowchart showing a method of processing information about the adjacent position between the navigation unit 220 and the server 240 according to the invention. First, when turning the power of the navigation unit 220 on, the navigation unit 220 operates and starts initialization (step 312). For example, the navigation unit 220 may initialize a variable or set a screen to an initial state, and reset data to be stored in the memory. Next, the navigation unit 220 sets the user's starting point, the desired destination and data (or specific data) required during a navigation task (step 314). In this case, the required data may include data such as route calculation, route guidance, and graphical feature and object as well as specific adjacent position information. The user does not necessarily set only one as the required data, but selects several kinds of data.

Then, if the navigation unit 220 completes the navigation setting and the user moves, the navigation unit 220 calculates a current user position using GPS, dead reckoning, or hybrid techniques (step 316). Next, the navigation unit 220 calculates a current user position based on the current position information and ID information. In this case, a check is made as to whether or not the current position information is stored in the map database 226 (step 318). If the current position information has been already stored therein, the navigation unit 220 displays a current user movement, and when necessary, changes a screen by scrolling (step 326). Conversely, if the current position information is not stored in the map database 226, the navigation unit 220 transmits the current position information to the server 240 in which navigation data is stored and requests data necessary for the current position (step 320).

Next, if the server 240 searches for only the requested data within the database 244 and transmits the searched result to a public network, then the navigation unit 220 downloads only the necessary data from the server 240 (step 322) to display the data on a screen (step 324), and then displays a user movement on the screen (step 326). Next, if the user desires to modify the starting point, the destination, or the necessary data while performing a navigation function, the navigation unit 220 returns to the step 314 to proceed again. Otherwise, if the user arrives at the desired destination or if the user requests the termination of navigation service (step 330), the navigation unit 220 terminates the navigation service. If not terminating the service, the navigation unit 220 calculates the current user position (step 316) again to continuously perform a navigation function.

Figure 4:
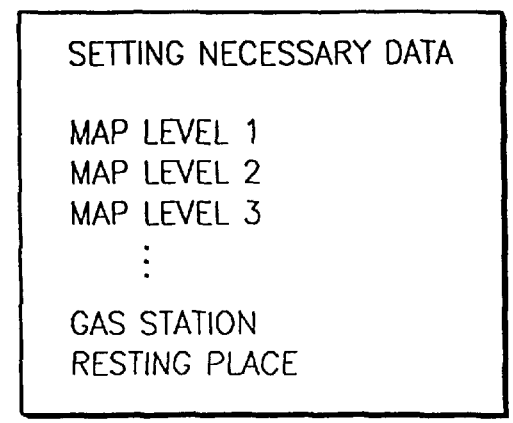
FIG. 4 illustrates a screen in which necessary data has been set as shown in FIG. 3 according to an embodiment of the present invention.

FIG. 4 shows an embodiment of a screen in which the necessary data has been set as shown in FIG. 3. Referring to FIG. 4, the navigation unit 220 sets a map level, a gas station, and a resting place as necessary data before the user starts, and while the user moves, it may reset the necessary information at any time. In this case, the navigation unit 220 can display all kinds of necessary data on a screen, but, alternatively, it can select the data by a scrolling method. According to another embodiment, the data may be grouped to display several groups of data on divided screens.

Figure 5A:
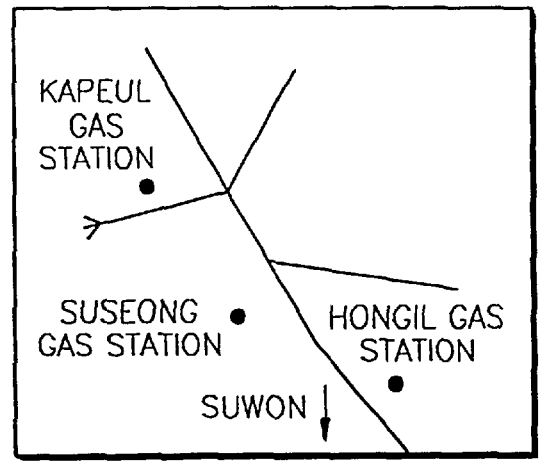
FIGS. 5A–5D are an example of a screen on which only necessary data for a route from Seoul to Daegu is displayed by downloading the necessary data from a server according to the invention.
Figure 5B:
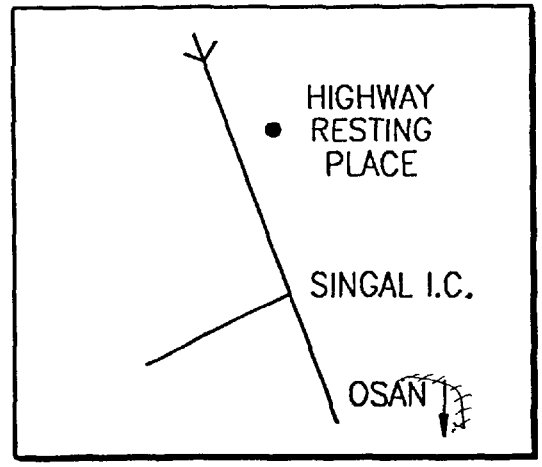
Figure 5C:
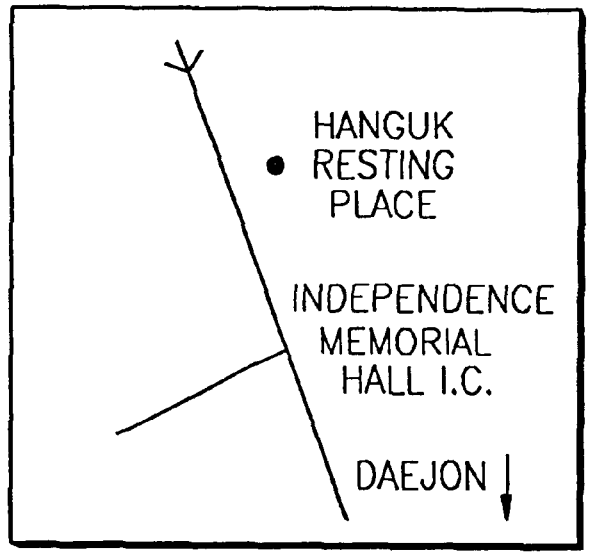
Figure 5D:
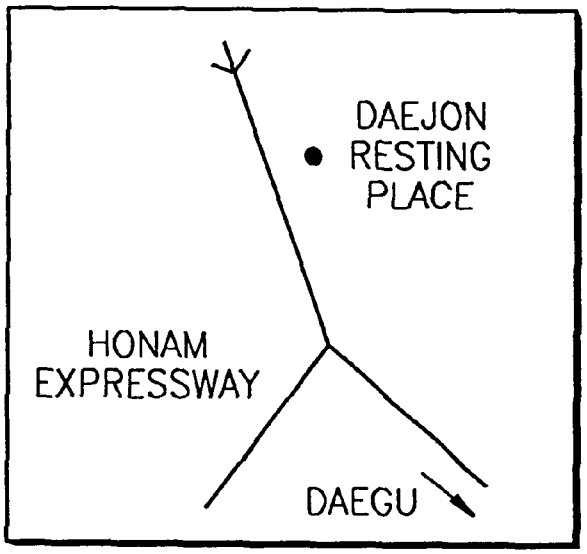

FIGS. 5A–5D show examples of the screen in which only the data necessary for a route from Seoul to Daegu is downloaded from the server 240 by the navigation unit 220. FIG. 5A is an example of the screen in which only gas station data is downloaded near Eulji Street in Seoul when the user starts after setting necessary data. FIG. 5B is an example of the screen in which only map data, gas station data, and resting place data for a position adjacent to the current position of the navigation unit 220 are downloaded when the user moves in the vicinity of Singal Interchange (IC) of Suwon. FIGS. 5O and 5D are examples of the screen when the navigation unit 220 moves to other places.

While this invention has been particularly shown and described with reference to preferred embodiments thereof, it will be understood by those skilled in the art that various changes in form and details may be made therein without departing from the spirit and scope of the invention. For example, the invention can be applied to any system having a wireless transceiver for calculating positions.

In a navigation system according to the invention, a memory size and the amount of data downloaded is reduced by downloading only necessary information without a need to have all information within the navigation system. Thus, the navigation system improves the efficiency of a wireless environment as well as the data processing efficiency.

What is claimed is:

1. A method of processing navigation information in a navigation system including a database, the method comprising the steps of:
    (a) setting a starting point, a destination, and specific information to be displayed on a screen;
    (b) calculating a current user position based on position information received via a wireless network and identification (ID) information;
    (c) displaying a user movement, if information about a position adjacent to the current user position calculated in the step (b) is stored in the database, based on the stored information, and if not, requesting a server to send specific information about the adjacent position which is set in the step (a); and
    (d) downloading only the specific information to display a downloaded result on a screen while displaying a user movement on a corresponding screen, if the specific information about the position adjacent to the current user position, which is requested in the step (c), is searched for by the server.

2. The method of claim 1, further comprising the step of resetting the specific information about the adjacent position after displaying the user movement.

3. The method of claim 1, wherein the specific information about the adjacent position includes one or more of position information, route calculation information, guidance information, and graphical feature and object information.

4. A navigation system comprising:
    a navigation unit which transmits current user position information to a server after calculating the current user position using position information received from a wireless network to request only specific information about a position adjacent to the current user position, and which displays a user movement based on the specific information about the adjacent position after downloading the specific information about the adjacent position from the server; and a server which searches for only the specific information about the adjacent position with respect to the current position according to the current user position and the request for the specific information about the adjacent position received ii from the navigation unit and transmits the searched result to the navigation unit.

5. The navigation system of claim 4, wherein the navigation unit comprises:

a receiver for receiving position information via a public network; and a processing unit for calculating a current user position using position information received by the receiver and stored identification (ID) information and for requesting the server for specific adjacent position information based on the current position information to download the same.

6. The navigation system of claim 5, wherein the navigation unit further comprises:

a map database for storing map data;

a display unit for displaying position information; and an interface unit for interfacing map information received from the server and navigation information sent to the server.

7. The navigation system of claim 4, wherein the position information received from the wireless network is global positioning system (GPS) data.

* * * * *